(12) United States Patent
Akirav et al.

(10) Patent No.: US 10,803,019 B2
(45) Date of Patent: Oct. 13, 2020

(54) HASH-BASED MULTI-TENANCY IN A DEDUPLICATION SYSTEM

(71) Applicant: INTERNATIONAL BUSINESS MACHINES CORPORATION, Armonk, NY (US)

(72) Inventors: Shay H. Akirav, Petach-Tikva (IL); Yariv Bachar, Ma'abarot (IL); Joseph W. Dain, Vail, AZ (US); Gregory T. Kishi, Oro Valley, AZ (US); Osnat Shasha, Holon (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 416 days.

(21) Appl. No.: 14/322,079

(22) Filed: Jul. 2, 2014

(65) Prior Publication Data
US 2016/0004716 A1    Jan. 7, 2016

(51) Int. Cl.
*G06F 16/174* (2019.01)
*G06F 16/22* (2019.01)
*G09C 1/00* (2006.01)

(52) U.S. Cl.
CPC ...... *G06F 16/1748* (2019.01); *G06F 16/2255* (2019.01); *G09C 1/00* (2013.01)

(58) Field of Classification Search
CPC .. G06F 17/30156; G06F 17/3033; G06C 1/00
See application file for complete search history.

(56) References Cited

U.S. PATENT DOCUMENTS

| 8,291,490 | B1 | 10/2012 | Ahmed et al. |
| 8,447,829 | B1* | 5/2013 | Geller ................ G06F 9/468 709/217 |
| 2010/0030995 | A1 | 2/2010 | Wang et al. |
| 2012/0254111 | A1* | 10/2012 | Carmichael ....... G06F 17/30094 707/627 |
| 2014/0013112 | A1 | 1/2014 | Cidon et al. |
| 2014/0215590 | A1* | 7/2014 | Brand ................ H04L 67/1097 726/6 |
| 2014/0282884 | A1* | 9/2014 | Bao ........................ G06F 21/31 726/4 |

FOREIGN PATENT DOCUMENTS

| CN | 101639835 A | 2/2010 |
| CN | 103118053 A | 5/2013 |
| JP | 2013182476 A | 9/2013 |

* cited by examiner

*Primary Examiner* — Ashish Thomas
*Assistant Examiner* — Dustin D Eyers
(74) *Attorney, Agent, or Firm* — Griffiths & Seaton PLLC

(57) ABSTRACT

In a hash-based multi-tenancy in a deduplication system, incorporating, as if part of input data, a tenant identification (ID) into a hash value calculation using a single hash based index table for separating data segments in a multi-tenant deduplication system.

6 Claims, 4 Drawing Sheets

US 10,803,019 B2

HASH-BASED MULTI-TENANCY IN A DEDUPLICATION SYSTEM

BACKGROUND OF THE INVENTION

Field of the Invention

The present invention relates in general computing systems, and more particularly to, systems and methods for hash-based multi-tenancy in a deduplication system.

Description of the Related Art

In today's society, computer systems are commonplace. Computer systems may be found in the workplace, at home, or at school. A data processing system typically includes a processor subsystem having at least one central processing unit (CPU), an input/output (I/O) subsystem, a memory subsystem and a bus subsystem. The memory subsystem of the data processing system typically includes a data storage system having a controller connected to a back end storage. The controller controls the flow of data between the data processing system and the back end storage.

These data processing systems may include data storage systems, or disk storage systems, to process and store data. Large amounts of data have to be processed daily and the current trend suggests that these amounts will continue being ever-increasing in the foreseeable future. For the most part, computing systems face a significant challenge to meet the increasingly stringent demands for storing large amounts of data. An efficient way to alleviate the problem is by using deduplication. The idea underlying a deduplication system is to exploit the fact that large parts of the available data is copied again and again and forwarded without any change, by locating repeated data and storing only its first occurrence. Accordingly, it would be desirable to improve and optimize data deduplication and cloud computing.

SUMMARY OF THE INVENTION

In one embodiment, a method is provided for hash-based multi-tenancy in a deduplication system using a processor device in a computing environment. In one embodiment, by way of example only, the method incorporates, as if part of input data, a tenant identification (ID) into a hash value calculation using a single hash based index table for separating data segments in a multi-tenant deduplication system.

In another embodiment, a computer system is provided for hash-based multi-tenancy in a deduplication system using a processor device, in a computing environment. The computer system includes a computer-readable medium and a processor in operable communication with the computer-readable medium. In one embodiment, by way of example only, the processor, incorporates, as if part of input data, a tenant identification (ID) into a hash value calculation using a single hash based index table for separating data segments in a multi-tenant deduplication system.

In a further embodiment, a computer program product is provided for hash-based multi-tenancy in a deduplication system using a processor device, in a computing environment. The computer-readable storage medium has computer-readable program code portions stored thereon. The computer-readable program code portions include a first executable portion that, incorporates, as if part of input data, a tenant identification (ID) into a hash value calculation using a single hash based index table for separating data segments in a multi-tenant deduplication system.

In addition to the foregoing exemplary method embodiment, other exemplary system and computer product embodiments are provided and supply related advantages.

The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
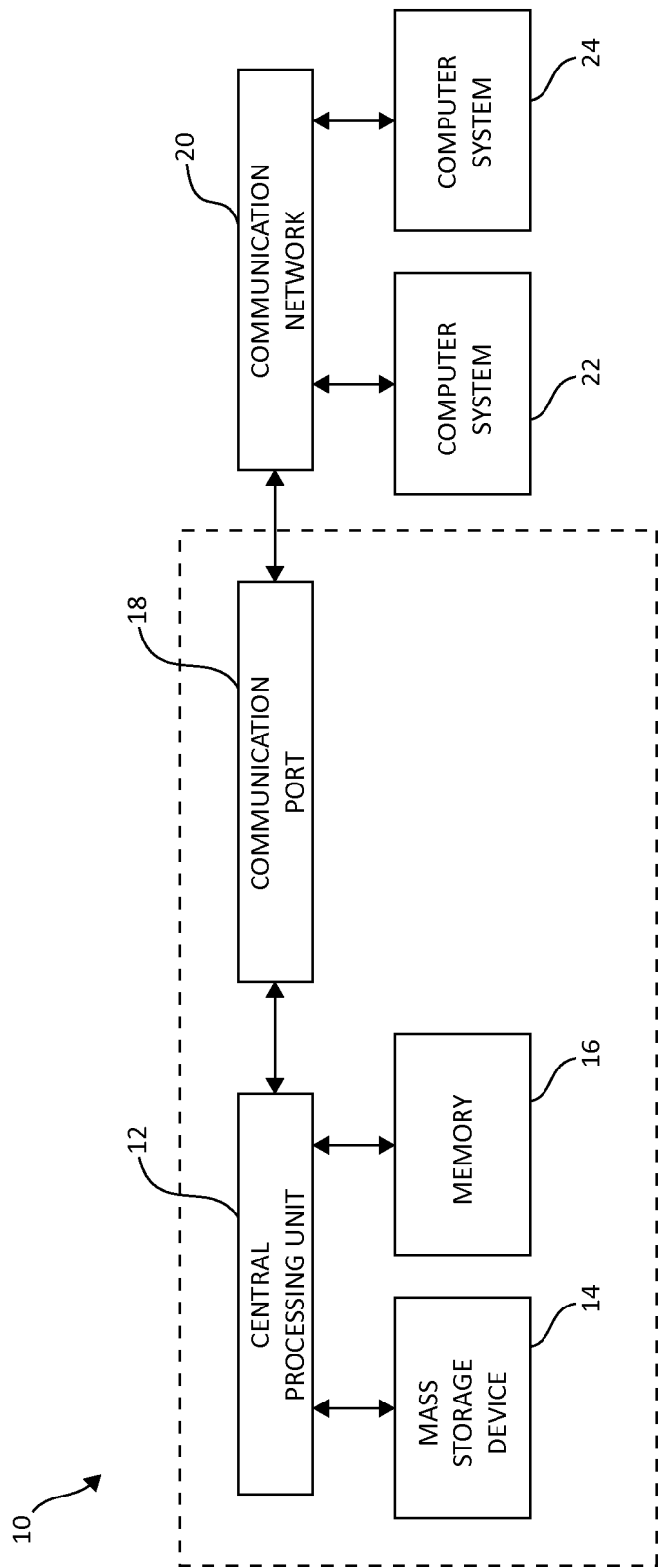
FIG. 1 is a block diagram illustrating a computing system environment having an example storage device in which aspects of the present invention may be realized.

In recent years, cloud computing provides benefits for improving the storing of data. Cloud computing, which is the access of computing resources and data via a network infrastructure, such as the Internet. The computing resources and data storage may be provided by linked data centers of the "cloud," i.e., network. Each of the data centers may include a plurality of servers that provide computing resources, as well as data storage and retrieval capabilities. Users of cloud computing generally do not need knowledge regarding or control over the underlying data center infrastructure of the "cloud". Rather, the users may access the computing resources and data storage capabilities on an as-needed basis.

Moreover, many service providers are required to provide multi-tenancy service, which facilitates storage domains with the storage systems. The storage domains, which may have their own dedicated storage resources within the storage server (e.g. physical pools), are called "tenants domains." Storage client and/or group of clients may choose to use or not use tenants domains based on data nature: the client may put data in a global pool (no tenancy support) while other data on specific pool and hence will have a unique tenant domains for this purpose. This model is referred as multi-tenant storage. In the multi-tenant storage service, the service provider (SP) is required to protect each of the tenant data by preventing: 1) a leakage of data segments between tenants domains, 2) crossing tenant's domain boundaries: access of one tenant data blocks by another (even accidently), and 3) impact of data corruption of one tenant domain data blocks to other tenants domains.

For example, in Copy Services scope management, Copy Service relationships can be limited to the domain of a set of user-specified resources. Additionally, user IDs can be configured to allow them only to issue Copy Services requests against a specific domain. This facilitates multi-tenancy by preventing any host or user from initiating a Copy Services operation that would cross specific tenant domain boundaries. In addition to the multi-tenant capability, Copy Services domains can also provide general-purpose partitioning to isolate heterogeneous environments from each other.

In addition to cloud computing, data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks (chunks and/or blocks may also be referred to as data segments). In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form.

Most deduplication systems use hash-based index in order to locate existing data segments stored in the system. When new data streams enter the Deduplication system, the data is broken into data segments and for each data segment there is a representing hash value calculated. Each one of the new hash values is searched in the hash-based index, and if the new hash value is found, the matching data segment is considered identical and the new data segment is not written into the system. Instead, the already existing data segment is pointed. In other words, the data segments (e.g., blocks) with the same hash value are identified and only one copy of that data block is stored. Pointers to all the locations of the blocks with the same data are stored in a table, in association with the hash value of the blocks.

Deduplication is used to save storage space, but in case of multi-tenancy, deduplication actually creates sharing of data segments between different tenants using the same system, which may be something the clients are not willing to accept. Accordingly, a need exists for improving data deduplication system in cloud computing.

One way to address the problem is to maintain a dedicated hash-based index for each tenant. Since the deduplication hash-based index is usually in the core of the system and one of the biggest resource consumers, it may lead to a waste of resources such as memory space, disk space and other optimized resources in the system. As such, in one embodiment, the present invention provides for using only one (single) hash-based index but incorporate a tenant ID into the hash calculation, as if it is a part of the input data. Incorporating a tenant ID into the hash calculation, as if it is a part of the input data, causes two different tenants to point to two different data segments, even when the original data segments are identical in content.

In one embodiment, the present invention provides for hash-based multi-tenancy in a deduplication system using a processor device in a computing environment. In one embodiment, by way of example only, the method incorporates, as if part of input data, a tenant identification (ID) into a hash value calculation using a single hash based index table for separating data segments in a multi-tenant deduplication system. In one embodiment, the incorporating the tenant ID into the hash value calculation using a single hash based index table for separating data segments in a multi-tenant deduplication system is performed in a backup storage device with deduplication engine, which handles block level storage and not at the file level. By incorporating, as if part of input data, the tenant ID into the hash value calculation using the single hash based index table, leakage of data segments between tenants domains and the access of one or more tenant data blocks by another (even accidentally), and the impact of data corruption of one tenant data blocks to other tenants domains is prohibited.

In one embodiment, the present invention provides the for hash-based multi-tenancy in multi-tenant (cloud) deduplication system, and rather than segmenting a file into multiple file segments at the file level, the present invention incorporates a tenant ID into the hash calculations as if it is part of input data to separate the data and is performed in a backup storage device with a deduplication engine, which handles the block level storage and not the file level. In one embodiment, a dedicated and/or shared virtual and/or physical storage pool is provided per each tenant in the event that a client requires physical storage (e.g. disks separation) per each tenant to strengthen privacy and confidentiality. For example, in case of backup storage with a deduplication engine, there is no dedicated physical storage pool per tenant as defined in storage systems, but there is one repository that may be comprised of a dedicated storage pool and/or shared storage pool that would be shared between the tenants. In an additional embodiment, the present invention enables to put tenant data on different storage pools—so both case are possible. In general, the dedicated physical storage pool for a tenant is an option and the present invention helps to achieve it. In an additional embodiment, the present invention uses virtual storage pools and not only physical storage pools.

The deduplication engine with the capability describe above supports this separation activity since the deduplication engine completely separates the data of the tenants while preserving a single deduplication hash based index. Also, to enhance data security and privacy for preventing an unauthorized user (attack) from determining the hash separation and hash calculation technique by the unauthorized user seeding his/her data with known hash collision data, which may cause corruption in the data of all other clients that use the same system, the present invention uses the tenant ID (which is encrypted) to eliminate the effect of the aforementioned attack and introduce a level of encryption that will make it much more difficult to perform such an attack.

In addition to the understood definition of "tenant" as used in the current state of the art, the term tenant, as used herein, may include/represent a client, a group of clients, while the term "tenant domain", as used herein, may include/represent pool(s) of data. For example client X could choose to put some of client X's data in a global pool (no tenant ID) and other data in a specific pool (unique tenant ID). Or, if the present invention extended to a virtualization engine (e.g., IBM® Virtualization engine TS7700), the "tenant ID" might be associated with "storage pool"—a "non-client" based separation of data.

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
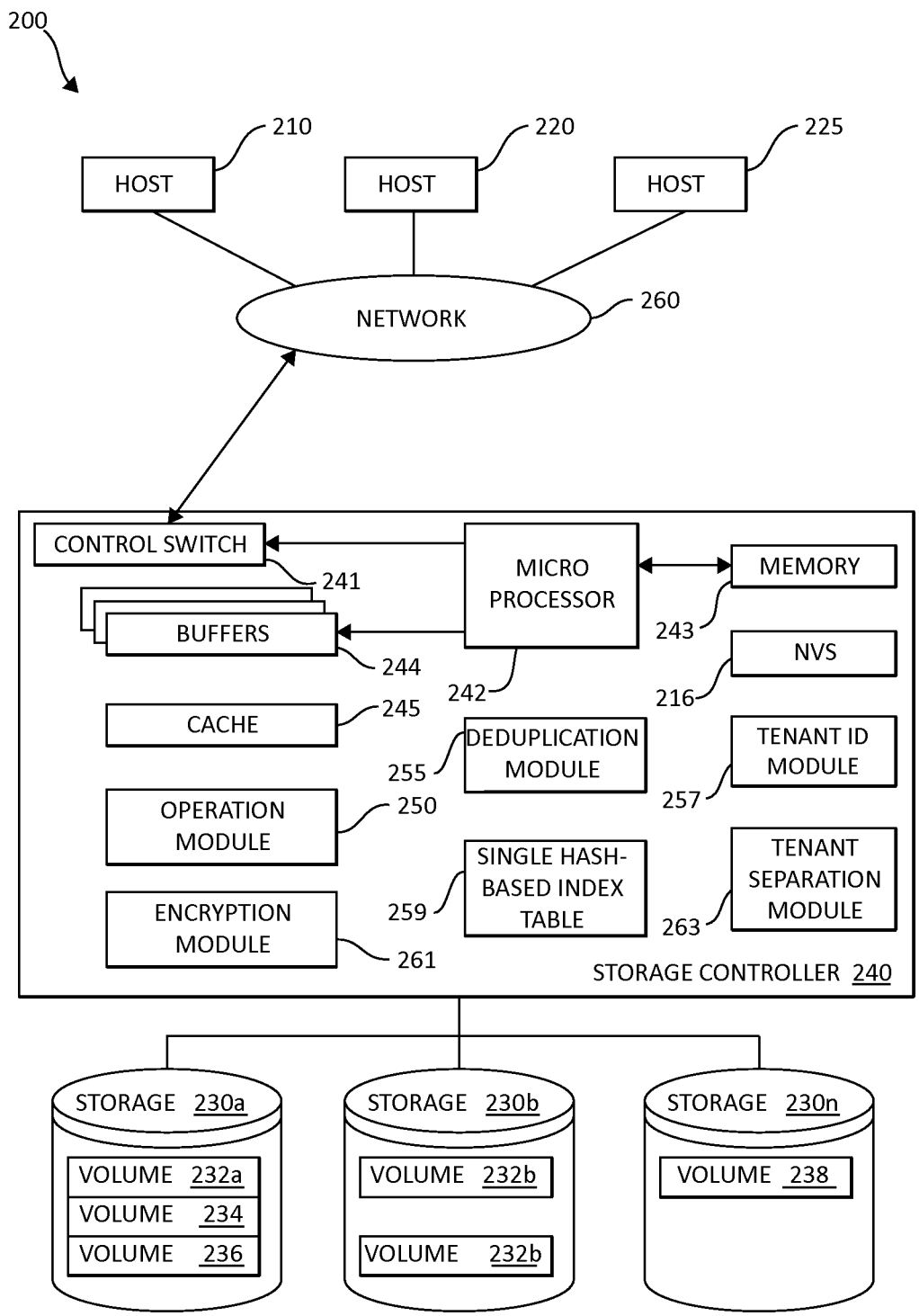
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and nonvolatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a deduplication module 255, a tenant ID module 257, a single hash-based index table 259, a encryption module 261, and a tenant separation module 263. The deduplication module 255, the tenant ID module 257, the single hash-based index table 259, the encryption module 261, and the tenant separation module 263 may work in conjunction with each and every component of the storage controller 240, the hosts 210, 220, 225, and storage devices 230. The deduplication module 255, the tenant ID module 257, the single hash-based index table 259, the encryption module 261, the tenant separation module and 263 may be structurally one complete module or may be associated and/or included with other individual modules. The deduplication module 255, the tenant ID module 257, the single hash-based index table 259, the encryption module 261, and the tenant separation module 263, may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the deduplication module 255, the tenant ID module 257, the single hash-based index table 259, the encryption module 261, and the tenant separation module 263, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, the deduplication module 255, the tenant ID module 257, the single hash-based index table 259, the encryption module 261, and the tenant separation module 263 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

As mentioned above, the deduplication module 255, the tenant ID module 257, the single hash-based index table 259, the encryption module 261, and the tenant separation module 263, may also be located in the cache 245 or other components. As such, one or more of the deduplication module 255, the tenant ID module 257, the single hash-based index table 259, the encryption module 261, and the tenant separation module 263, maybe used as needed, based upon the storage architecture and users preferences. Each of the components within the devices shown may be linked together and may be in communication with each other for purposes suited to the present invention.

Figure 3:
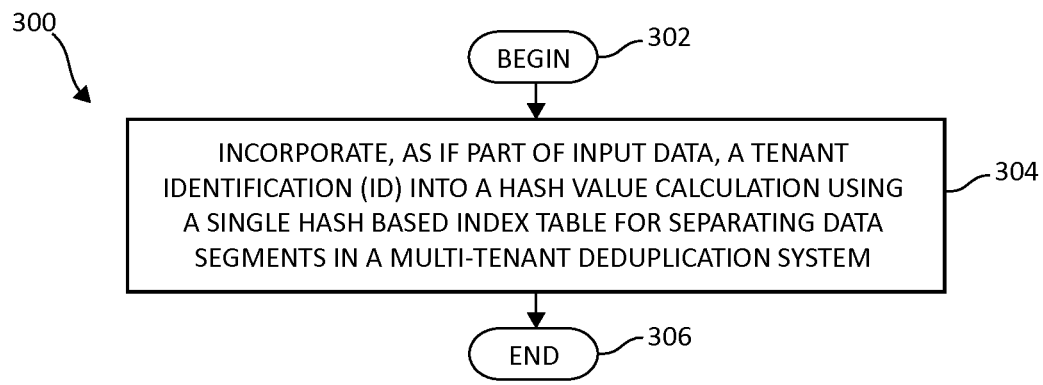
FIG. 3 is a flowchart illustrating an exemplary method for lookup-based data block alignment for data deduplication in which aspects of the present invention may be realized.

FIG. 3 is a flowchart illustrating an additional exemplary method 300 for hash-based multi-tenancy in a deduplication system in which aspects of the present invention may be realized. The method 300 begins (start 302) by incorporating, as if part of input data, a tenant identification (ID) into a hash value calculation using a single hash based index table for separating data segments in a multi-tenant deduplication system (step 304). The method ends (step 306).

In one embodiment, when new data streams enter the deduplication system, the data is broken into data segments, and for each data segment, there is a representing hash value calculated. When breaking of the data stream into data segments each data segment still receives a hash value, but the hash value is calculated in a way that is also taking into account the tenant ID. In one embodiment, there are more than one ways to cause the hash function to take into account the tenant ID. For example, one way uses the following implementation. Assume a data segment size of 4 thousand (K) is processed in a system where each tenant has a unique 4 bytes ID, Tenant ID. The same hash algorithm (e.g. cryptographic hash functions SHA-2) that is used without multi-tenancy support can be used here as well. But instead of calculating the hash only on the data segment, the calculation is performed on a concatenation of the 4096 bytes data segment along with the 4 bytes tenant ID to create an artificial "extended" data segment of 4100 bytes (4096 byte plus (+) 4 byte) size just for the calculation). In this way, two different tenants get two different value values even though both 4K data segments of the tenants are identical. As such, this example may be one possible implementation for the general case, which is depicted below in the following hash function equation:

$$\text{HASH}\{F(4096\text{Byte Data Segment}, 4 \text{ Byte Tenant ID } A)\} = \text{hashValue}A \quad (1),$$

where F is the function, 4096 (any size byte size may be used here) is a byte size of the data segment, Tenant ID A is the tenant ID for a data segment arbitrarily labeled "A", and hashValueA is the calculated hash value for data segment "A" when incorporating the tenant ID. In this implementation only one hash-based index is used.

Figure 4:
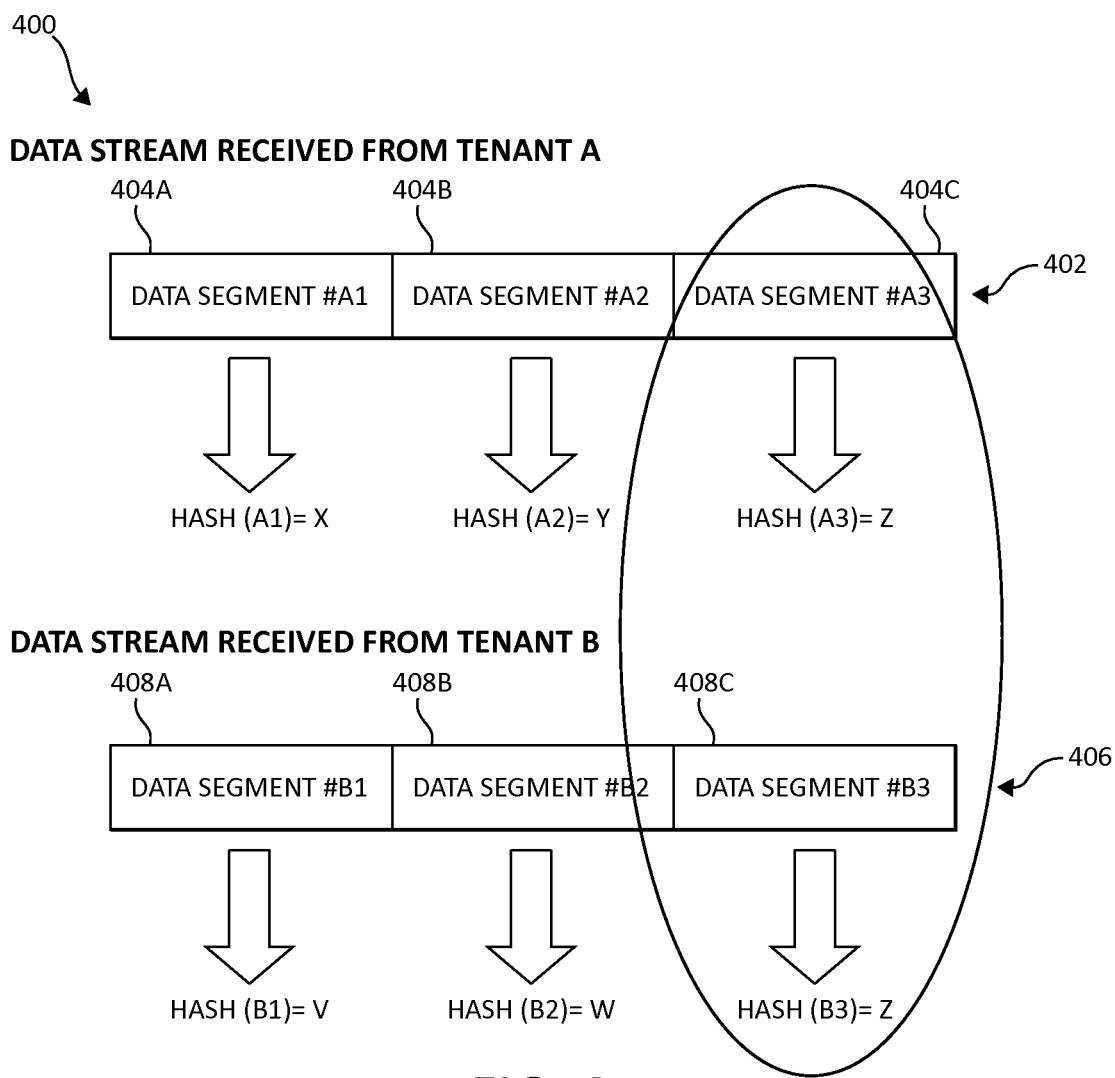
FIG. 4 is a block diagram illustrating deduplication systems when ignoring the tenancy in which aspects of the present invention may be realized.

Turning now to FIG. 4, a block diagram 400 illustrating a deduplication system when ignoring the tenancy in which aspects of the present invention may be realized. FIG. 4 depicts an example of a deduplication system when ignoring the tenancy. FIG. 4 illustrates a data stream 402 received from tenant domain A and a data stream 406 received from tenant domain B. There are 3 data segments 404A-C (Data segment's # A1-A3) in the data stream 402 received from tenant A. There are 3 data segments 408A-C (Data segment's # B1-B3) in the data stream 406 received from tenant B. Each data segment contains a hash value calculated using a hash function. For example, for the three data segments 404 in data stream 402 received from tenant A, data segment # A1 has a hash value (A1) equal to "X" (seen in FIG. 4 as Hash (A1)=X). Data segment # A2 has a hash value (A2) equal to "Y" (seen in FIG. 4 as Hash (A2)=Y). Data segment # A3 has a hash value (A3) equal to "Z" (seen in FIG. 4 as Hash (A3)=Z). For the three data segments 408 in data stream 406 received from tenant B, data segment # B1 has a hash value (B1) equal to "V" (seen in FIG. 4 as Hash (B1)=V). Data segment # B2 has a hash value (B2) equal to "W" (seen in FIG. 4 as Hash (B2)=W). However, data segment # B3 has a hash value (B3) equal to "Z" (seen in FIG. 4 as Hash (B3)=Z). Since two data segments 404C and 408C (Data segment # A3 404C of tenant A and Data segment # B3 408C of tenant B) have the same hash value (e.g., Hash (B3)=Z as seen in FIG. 4), the matching data segment is considered identical and the new data segment is not written into the system. The two streams will end up with pointing to the same data segment.

Figure 5:
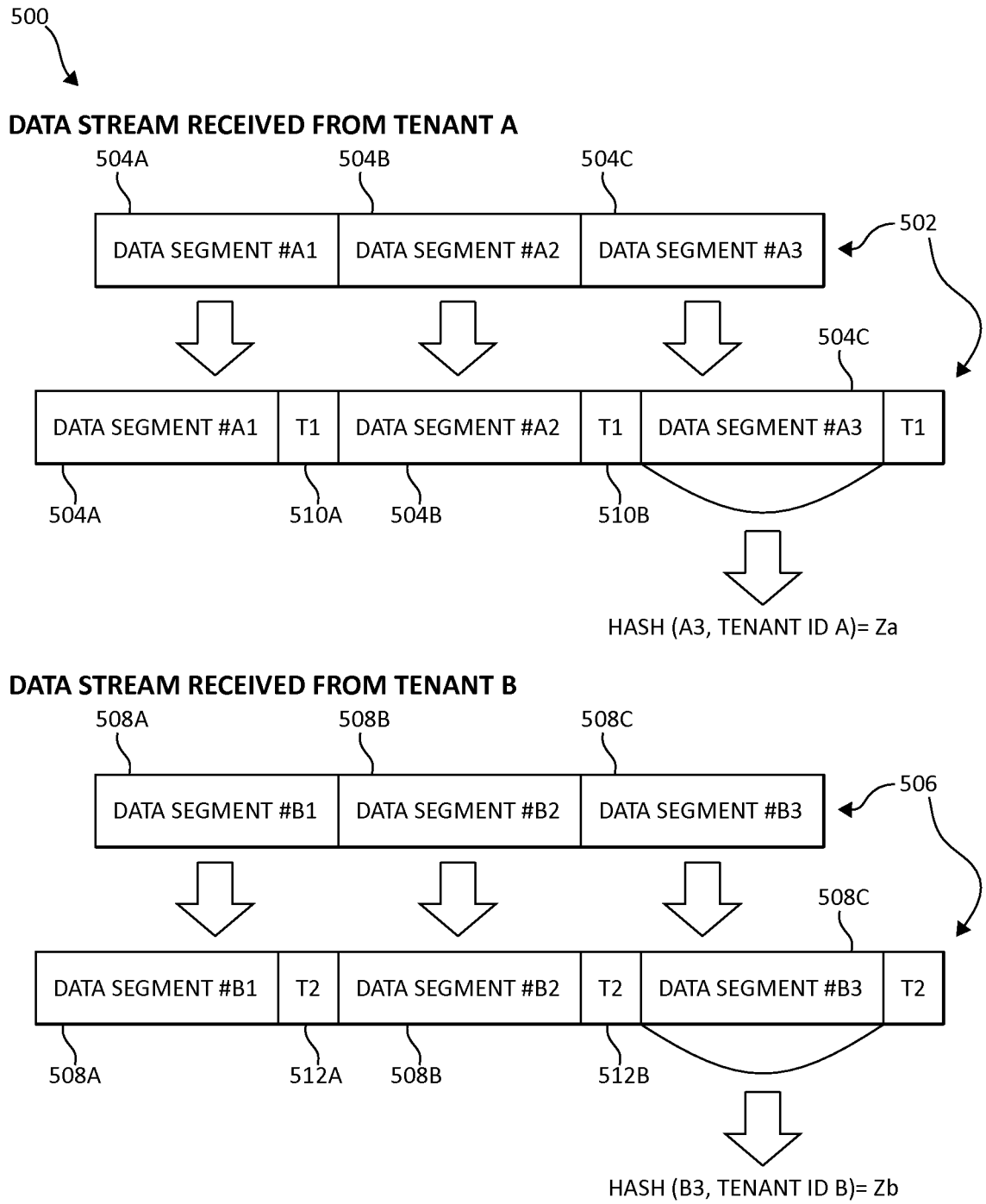
FIG. 5 is a block diagram illustrating deduplication systems when hash function takes into account the tenant ID when calculating the hash value in which aspects of the present invention may be realized.

FIG. 5 is a block diagram illustrating a deduplication system 500 when a hash function takes into account the tenant ID when calculating the hash value in which aspects of the present invention may be realized. FIG. 5 illustrates a data stream 502 received from tenant A and a data stream 506 received from tenant B. There are 3 data segments 504A-C (Data segment's # A1-A3) in the data stream 502 received from tenant A. There are 3 data segments 508A-C (Data segment's # B1-B3) in the data stream 506 received from tenant B. Each data segment contains a hash value calculated using a hash function, but the hash value is calculated by also taking into account the tenant ID. In one embodiment, the calculation is performed on a concatenation of the a predefined number of bytes the data segments along with the tenant ID to create an artificial "extended" data segment size, just for the calculation.

For example, using the same architectural structure of the 2 data streams 502 and 506 there are three data segments 504 in data stream 502 received from tenant A and three data segments 508 in data stream 506 received from tenant B. In this example, for data stream 502 received from tenant A, tenant ID's 510A-C are now incorporated, as if part of input data, into a hash value calculation using a single hash based index table for separating data segments 504A-C in a multi-tenant deduplication system. Similarly, for data stream 506 received from tenant B, tenant ID's 512A-C are now incorporated, as if part of input data, into a hash value calculation using a single hash based index table for separating data segments 508A-C in the multi-tenant deduplication system.

Thus, unlike data segment # A3 404C and data segment # B3 408C (as seen in the example in FIG. 4), by incorporating the tenant IDs 510 and 512, as if part of input data, into a hash value calculation using a single hash based index table for separating data segments in a multi-tenant deduplication system, the data segment # A3 504C and data segment # B3 508C will have two different hash values for preventing the identical data segments in different tenants from ending up pointing to the same data segment.

For example, data segment # A3 504C now has a newly calculated hash value including the tenant ID 510C (e.g., as seen in FIG. 5 as Hash (A3, tenant ID A)=Za). Furthermore, for the second data stream 506 received from tenant B, data segment # B3 has a newly calculated hash value including the tenant ID 512C (e.g., as seen in FIG. 5 as Hash (B3, tenant ID B)=Zb). Since two data segments 504C and 508C (data segment # A3 of tenant A and data segment # B3 of tenant B) have different hash value, the matching data segment is no longer considered identical and the new data segment is written into the system. The two streams now will not end up pointing to the same data segment. In this way, two different tenants get two different value values even though both data segments of the tenants are identical and/or come from the identical, original data stream. In should be noted that the hash value calculation may be performed on a concatenation of the data segments 504 and 508 along with using the tenant IDs 510A-C and 512A-C to create artificial, extended data segments 504A-C and 508A-C. Both tenant A and tenant B are separated into a separate, physical storage pool, independent from each other. The tenant ID's 510A-C and 512A-C are associated with the respective, physical storage pools per tenant. In other words, by using the new hash value that includes the incorporated tenant ID 510C, data segment # A3 504C is associated with a separate, physical storage pool that is assigned to tenant A. Furthermore, data segment # B3 has a new and different hash value (as compared to the incorporated tenant ID 510C, data segment # A3 504C) that includes the incorporated tenant ID 512C and is associated with the separate, virtual and/or physical storage pool that is assigned to tenant B. Thus, the data segments 504 and 508 are isolated. In this way, the leakage of data segments between tenants domains, access of one tenant data blocks by another (even accidently), and the impact of data corruption of one tenant data blocks to other tenants is eliminated.

In one embodiment, the present invention provides for hash-based multi-tenancy in a deduplication system using a processor device in a computing environment. In one embodiment, by way of example only, the present invention incorporates, as if part of input data, a tenant identification (ID) into a hash value calculation using a single hash based index table for separating data segments in a multi-tenant deduplication system. A new hash value is generated based upon incorporating the tenant ID. In one embodiment, the hash value calculation is performed on a concatenation of a data segment along with using the tenant ID to create an artificial, extended data segment. Different hash values are assigned to each one of a plurality of tenants for requiring the plurality of tenants to point to different data segments even if the different data segments are identical. Each one of a plurality of tenants are separated and stored on a r epository(s). The repository is at least one of a virtual storage pool and a physical storage pool, and the repository is at least one of a dedicated storage pool and a shared storage pool. In one embodiment, the tenant ID is associated with the repository. Access to each data segment is controlled by prohibiting access of one tenant to data segments of other tenants. In this way, the leakage of data segments between tenants domains, access of one tenant data blocks by another (even accidently), and the impact of data corruption of one tenant data blocks to other tenants is eliminated.

In one embodiment, the performs each one of and/or at least one of using an encryption key for encrypting the data segments for each one of a plurality of tenants, and encrypting each tenant ID for each one of a plurality of tenants for data segment security.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for hash-based multi-tenancy in a deduplication system by a processor device in a computing environment, the method comprising:

receiving, by a deduplication engine handling block level storage, a data stream of input data written to the block level storage by one of a plurality of tenants, wherein each of the plurality of tenants are a host computing device remotely located to, yet in communication with, the block level storage;

dividing, by the deduplication engine, the data stream into data segments comprising the input data;

responsive to dividing the data stream into the data segments, incorporating by the deduplication engine, as if part of the input data written by the one of the plurality of tenants, a tenant identification (ID) of the one of the plurality of tenants into a hash value calculation of at least some of the data segments as the input data is written into the block level storage, wherein, when writing the input data, the deduplication engine withholds deduplication on those of the data segments having the hash value calculation incorporating the tenant ID notwithstanding whether those of the data segments having the hash value calculation incorporating the tenant ID are identical in data content to any existing data segments stored in the block level storage, the deduplication withheld by virtue of hash values generated by the hash value calculation of those of the data segments incorporating the tenant ID mismatching hash values of the existing data segments of the identical data content written by others of the plurality of tenants such that the deduplication engine treats those of the data segments having the hash value calculation incorporating the tenant ID as new data segments, and wherein each of the hash values of those of the data segments having the hash value calculation incorporating the tenant ID and the existing data segments is stored in a single hash based index table;

initiating the incorporation of the tenant ID into the hash value calculation of each of those of the data segments by performing the hash value calculation on a concatenation of a first predefined number of bytes of each data segment while incorporating the tenant ID into the hash value calculation to create an artificial, extended data segment having an extended size of a second predefined number of bytes, wherein the second predefined number of bytes is larger than the first predefined number of bytes; and responsive to completing the hash value calculation, storing each of those of the data segments respectively in one of a plurality of independent storage pools according to the hash values incorporating the tenant ID, wherein each of the plurality of tenants are assigned one of the plurality of independent storage pools such that access of the one of the plurality of tenants to data having a hash value incorporating the tenant ID of any other tenant is prohibited.

2. The method of claim 1, further including performing at least one of:

using an encryption key for encrypting the data segments for each one of the plurality of tenants, and encrypting each tenant ID for each one of a plurality of tenants for data segment security.

3. A system for hash-based multi-tenancy in a deduplication system in a computing environment, the system comprising:

a deduplication engine; and at least one processor device operable in the computing environment and controlling the deduplication engine, wherein processor device:

receives, by the deduplication engine handling block level storage, a data stream of input data written to the block level storage by one of a plurality of tenants, wherein each of the plurality of tenants are a host computing device remotely located to, yet in communication with, the block level storage, divides, by the deduplication engine, the data stream into data segments comprising the input data, responsive to dividing the data stream into the data segments, incorporates by the deduplication engine, as if part of the input data written by the one of the plurality of tenants, a tenant identification (ID) of the one of the plurality of tenants into a hash value calculation of at least some of the data segments as the input data is written into the block level storage, wherein, when writing the input data, the deduplication engine withholds deduplication on those of the data segments having the hash value calculation incorporating the tenant ID notwithstanding whether those of the data segments having the hash value calculation incorporating the tenant ID are identical in data content to any existing data segments stored in the block level storage, the deduplication withheld by virtue of hash values generated by the hash value calculation of those of the data segments incorporating the tenant ID mismatching hash values of the existing data segments of the identical data content written by others of the plurality of tenants such that the deduplication engine treats those of the data segments having the hash value calculation incorporating the tenant ID as new data segments, and wherein each of the hash values of those of the data segments having the hash value calculation incorporating the tenant ID and the existing data segments is stored in a single hash based index table, initiates the incorporation of the tenant ID into the hash value calculation of each of those of the data segments by performing the hash value calculation on a concatenation of a first predefined number of bytes of each data segment while incorporating the tenant ID into the hash value calculation to create an artificial, extended data segment having an extended size of a second predefined number of bytes, wherein the second predefined number of bytes is larger than the first predefined number of bytes, and responsive to completing the hash value calculation, stores each of those of the data segments respectively in one of a plurality of independent storage pools according to the hash values incorporating the tenant ID, wherein each of the plurality of tenants are assigned one of the plurality of independent storage pools such that access of the one of the plurality of tenants to data having a hash value incorporating the tenant ID of any other tenant is prohibited.

4. The system of claim 3, wherein the at least one processor device performs at least one of:

using an encryption key for encrypting the data segments for each one of the plurality of tenants, and encrypting each tenant ID for each one of a plurality of tenants for data segment security.

5. A computer program product for hash-based multi-tenancy in a deduplication system in a computing environment by a processor device, the computer program product comprising a non-transitory computer-readable storage medium having computer-readable program code portions stored therein, the computer-readable program code portions comprising:

an executable portion that receives, by a deduplication engine handling block level storage, a data stream of input data written to the block level storage by one of a plurality of tenants, wherein each of the plurality of tenants are a host computing device remotely located to, yet in communication with, the block level storage;

an executable portion that divides, by the deduplication engine, the data stream into data segments comprising the input data;

an executable portion that, responsive to dividing the data stream into the data segments, incorporates by the deduplication engine, as if part of the input data written by the one of the plurality of tenants, a tenant identification (ID) of the one of the plurality of tenants into a hash value calculation of at least some of the data segments as the input data is written into the block level storage, wherein, when writing the input data, the deduplication engine withholds deduplication on those of the data segments having the hash value calculation incorporating the tenant ID notwithstanding whether those of the data segments having the hash value calculation incorporating the tenant ID are identical in data content to any existing data segments stored in the block level storage, the deduplication withheld by virtue of hash values generated by the hash value calculation of those of the data segments incorporating the tenant ID mismatching hash values of the existing data segments of the identical data content written by others of the plurality of tenants such that the deduplication engine treats those of the data segments having the hash value calculation incorporating the tenant ID as new data segments, and wherein each of the hash values of those of the data segments having the hash value calculation incorporating the tenant ID and the existing data segments is stored in a single hash based index table;

an executable portion that initiates the incorporation of the tenant ID into the hash value calculation of each of those of the data segments by performing the hash value calculation on a concatenation of a first predefined number of bytes of each data segment while incorporating the tenant ID into the hash value calculation to create an artificial, extended data segment having an extended size of a second predefined number of bytes, wherein the second predefined number of bytes is larger than the first predefined number of bytes; and an executable portion that, responsive to completing the hash value calculation, stores each of those of the data segments respectively in one of a plurality of independent storage pools according to the hash values incorporating the tenant ID, wherein each of the plurality of tenants are assigned one of the plurality of independent storage pools such that access of the one of the plurality of tenants to data having a hash value incorporating the tenant ID of any other tenant is prohibited.

6. The computer program product of claim 5, further including an executable portion that performs at least one of:
using an encryption key for encrypting the data segments for each one of the plurality of tenants, and
encrypting each tenant ID for each one of a plurality of tenants for data segment security.

* * * * *